(12) United States Patent
Kim (10) Patent No.: US 12,049,342 B2
(45) Date of Patent: Jul. 30, 2024

(54) PORTABLE PET FOOD BOWL ASSEMBLY

(71) Applicant: Amy Kim, Los Angeles, CA (US)

(72) Inventor: Amy Kim, Los Angeles, CA (US)

(*) Notice: Subject to any disclaimer, the term of this patent is extended or adjusted under 35 U.S.C. 154(b) by 150 days.

(21) Appl. No.: 17/347,523

(22) Filed: Jun. 14, 2021

(65) Prior Publication Data

US 2022/0201973 A1    Jun. 30, 2022

Related U.S. Application Data (60) Provisional application No. 63/130,546, filed on Dec. 24, 2020.

(51) Int. Cl.
| | |
|---|---|
| *A01K 7/00* | (2006.01) |
| *A01K 5/01* | (2006.01) |
| *B65D 21/02* | (2006.01) |
| *B65D 51/24* | (2006.01) |

(52) U.S. Cl.
CPC ....... B65D 21/0233 (2013.01); B65D 51/242 (2013.01); *A01K 5/0114* (2013.01); *A01K 7/00* (2013.01)

(58) Field of Classification Search
CPC ...... A01K 5/0114; A01K 7/00; A01K 5/0135; A01K 7/005; A01K 5/01; A01K 5/0128; A01K 1/0356; A01K 5/0121; A01K 5/0107; B65D 21/0233; B65D 51/242; B65D 43/0222; B65D 43/0204
USPC .................. 119/61.5, 51.01, 61.55
See application file for complete search history.

(56) References Cited

U.S. PATENT DOCUMENTS

| | | | | |
|---|---|---|---|---|
| 2,259,682 A | * | 10/1941 | Collins | A01K 5/0135 |
| | | | | D30/129 |
| 2,928,372 A | * | 3/1960 | Farley | A01K 5/0135 |
| | | | | D30/129 |
| 3,598,271 A | * | 8/1971 | Holley | B65D 21/0219 |
| | | | | 215/393 |
| 3,722,476 A | * | 3/1973 | Van Ness | A01K 5/0114 |
| | | | | 119/61.54 |
| 4,270,490 A | * | 6/1981 | Kopp | A01K 5/0114 |
| | | | | 119/61.5 |
| 4,600,253 A | | 7/1986 | Pongsengsook | |
| 5,105,768 A | * | 4/1992 | Johnson | A01K 7/005 |
| | | | | 119/72 |

(Continued)

FOREIGN PATENT DOCUMENTS

| | | | | |
|---|---|---|---|---|
| DE | 202012100473 U1 | * | 5/2012 | ........ A01K 5/0114 |
| TW | M508980 U | | 9/2015 | |

*Primary Examiner* — Timothy D Collins
*Assistant Examiner* — Jeffrey R Larsen
(74) *Attorney, Agent, or Firm* — Davidson Kappel LLC (57) ABSTRACT

A pet bowl assembly includes a first bowl including a first base and a first wall extending axially upwardly from the first base and a second bowl including a second base and a second wall extending axially upwardly from the second base. The bowl assembly also includes a lid including a lid base and a lip protruding downwardly from the lid base. The lip is configured for insertion in contact with the second wall such that the lid is configured for holding the second bowl in place inside the first bowl while an engagement of a lid engagement section of the lid with a first bowl engagement section of the first bowl removably connects the lid to the first bowl. The lid engagement section being on an outer circumferential surface of the lip and the first bowl engagement being on an inner circumferential surface of the first wall.

15 Claims, 8 Drawing Sheets

(56) References Cited

U.S. PATENT DOCUMENTS

| | | | | |
|---|---|---|---|---|
| 5,140,134 | A * | 8/1992 | Reusche | A47J 36/2483 |
| | | | | 392/444 |
| 5,209,184 | A * | 5/1993 | Sharkan | A01K 5/0114 |
| | | | | 119/61.56 |
| 5,586,656 | A * | 12/1996 | Abrums | B65D 21/0219 |
| | | | | 220/4.27 |
| 5,782,374 | A * | 7/1998 | Walker | A01K 5/01 |
| | | | | 119/61.5 |
| 5,787,839 | A * | 8/1998 | Magnant | B65D 25/32 |
| | | | | 206/545 |
| 5,799,792 | A * | 9/1998 | Abrums | B65D 21/0233 |
| | | | | 206/508 |
| 5,979,361 | A * | 11/1999 | Willinger | A01K 5/0135 |
| | | | | 119/61.54 |
| 6,152,318 | A * | 11/2000 | Walker | B65D 55/16 |
| | | | | 206/508 |
| 6,158,607 | A | 12/2000 | Wallberg | |
| 6,796,430 | B2 * | 9/2004 | Mercier | B65D 21/0222 |
| | | | | 206/505 |
| 6,886,694 | B2 * | 5/2005 | McNeeley | B65D 21/0222 |
| | | | | 206/508 |
| 7,263,949 | B1 * | 9/2007 | Seaford | A01K 7/00 |
| | | | | 119/51.5 |
| 10,111,410 | B2 * | 10/2018 | Glasser | B65D 21/0233 |
| 2004/0089583 | A1 * | 5/2004 | Coleman | B65D 25/24 |
| | | | | 206/561 |
| 2005/0051549 | A1 * | 3/2005 | Nelson | B65D 81/3216 |
| | | | | 220/23.83 |
| 2006/0201434 | A1 * | 9/2006 | Kujawa | A01K 5/0128 |
| | | | | 119/61.5 |
| 2008/0302307 | A1 * | 12/2008 | Bertsch | A01K 5/0114 |
| | | | | 119/61.5 |
| 2011/0214613 | A1 * | 9/2011 | Diamond | A01K 29/00 |
| | | | | 119/61.55 |
| 2013/0140211 | A1 * | 6/2013 | Robbins, III | B65D 11/20 |
| | | | | 206/517 |
| 2015/0208839 | A1 * | 7/2015 | Shalmoni | A47G 19/23 |
| | | | | 206/514 |
| 2016/0249584 | A1 * | 9/2016 | Yibao | A01K 5/00 |
| | | | | 119/61.5 |
| 2017/0071150 | A1 * | 3/2017 | Abbey | A01K 7/00 |
| 2017/0127647 | A1 * | 5/2017 | Owens, III | A01K 5/0114 |
| 2019/0059321 | A1 * | 2/2019 | Casale | B65D 43/165 |
| 2019/0301783 | A1 * | 10/2019 | Benbow | B65D 81/18 |
| 2020/0172292 | A1 * | 6/2020 | Serrahima | B65D 25/02 |
| 2020/0396961 | A1 * | 12/2020 | Zetouna | A23K 20/26 |

* cited by examiner

Fig. 10

PORTABLE PET FOOD BOWL ASSEMBLY

This claims priority of U.S. Provisional Patent Application No. 63/130,546, which is hereby incorporated-by-reference herein.

The present disclosure relates generally to pet bowls and more specifically to a portable pet food bowl assembly.

BACKGROUND

U.S. Pub. 2019/0059321A1 and U.S. Pat. No. 10,111,410B2 disclose portable pet bowls.

SUMMARY OF THE INVENTION

A portable pet bowl assembly is provided. The pet bowl assembly includes a first bowl including a first base and a first wall extending radially upwardly from the first base, and a second bowl including a second base and a second wall extending radially upwardly from the second base. The second bowl is configured for being received inside of the first bowl with the second base resting on the first base. The bowl assembly also includes a lid including a lid base and a lip protruding downwardly from the lid base. The lip is configured for insertion between the first wall and the second wall such that the lid is configured for holding the second bowl in place inside the first bowl while an engagement of a lid engagement section of the lid with a first bowl engagement section of the first bowl removably connects the lid to the first bowl. The lid engagement section is on an outer circumferential surface of the lip and the first bowl engagement is on an inner circumferential surface of the first wall.

A method of feeding a pet using the pet bowl assembly is also provided. The method includes disconnecting the lid from the first bowl and removing the lid from the first and second bowls; placing the lid on the ground; removing the second bowl from the first bowl and placing the second bowl on the lid; and providing one of food and water in the first bowl and proving the other of food and water in the second bowl.

BRIEF DESCRIPTION OF THE DRAWINGS

The present invention is described below by reference to the following drawings, in which.

DETAILED DESCRIPTION

FIGS. 1 to 10 shows various views of a portable pet bowl assembly 10 in accordance with an embodiment of the present disclosure. Pet bowl assembly 10 includes a lid 12, a first bowl 14 and a second bowl 16. Each of lid 12, a first bowl 14 and a second bowl 16 are centered on a center axis C. The terms axially, circumferential and radial, and derivatives thereof are used in reference to center axis C, unless otherwise specified. Lid 12 rests on top of first bowl 14 and lid 12 and first bowl 14 form an enclosure receiving second bowl 16.

Figure 1:
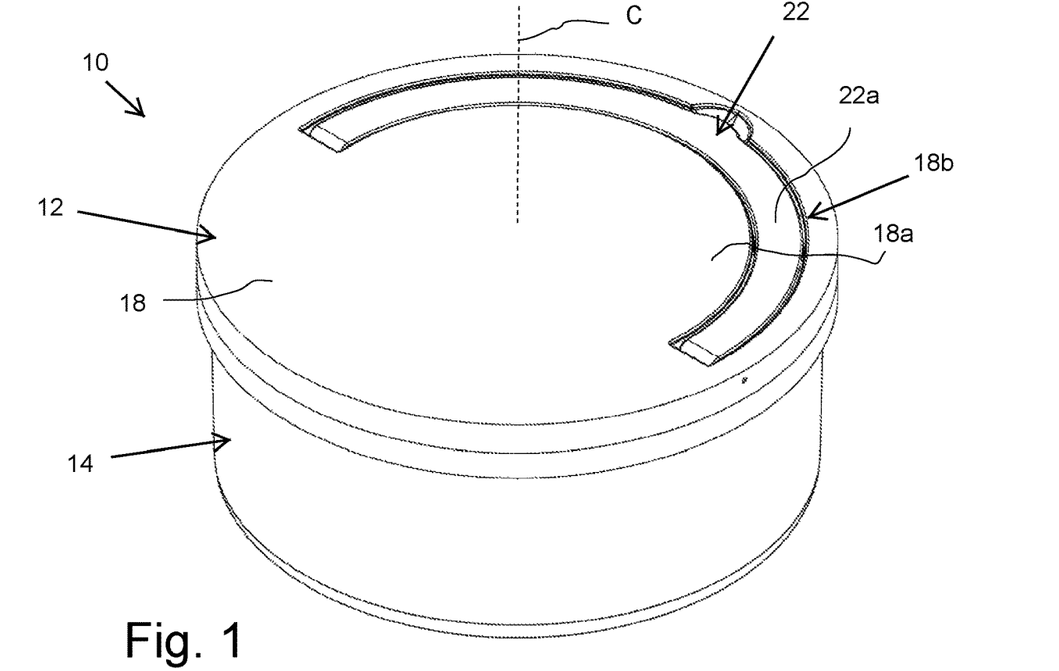
FIG. 1 shows an oblique view of a pet bowl assembly in accordance with an embodiment of the present disclosure in a portable configuration, with a second bowl inside of a first bowl and a lid connected to the first bowl.
Figure 2:
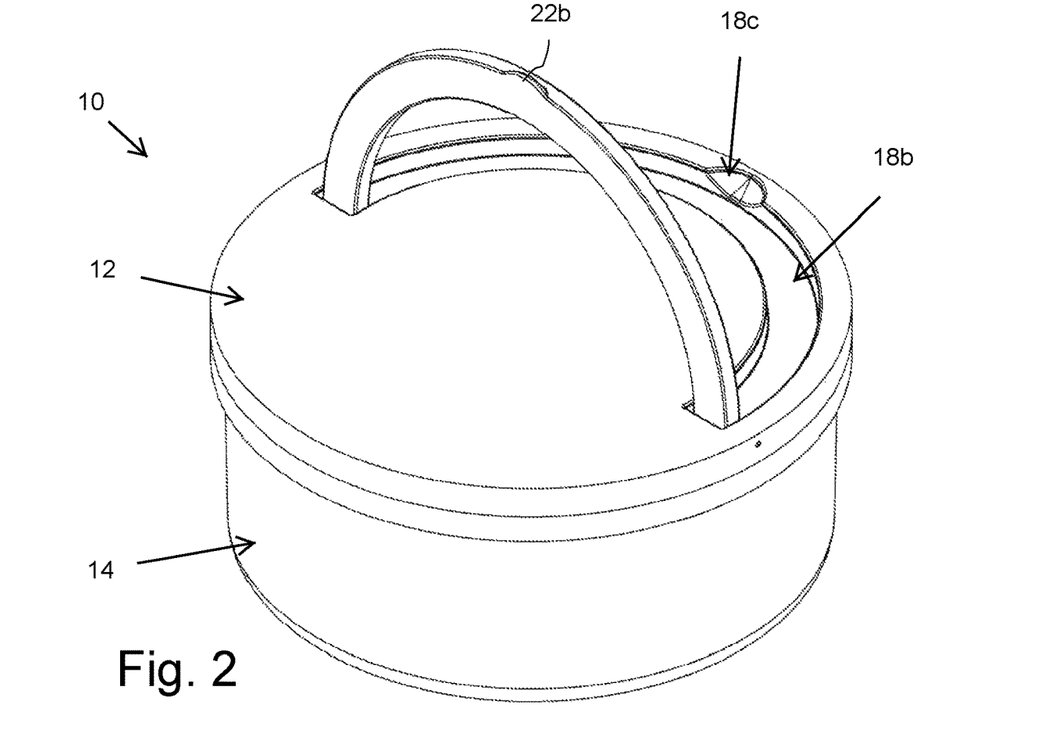
FIG. 2 shows an oblique view of the pet bowl assembly in the portable configuration with a handle of the lid raised.
Figure 3:
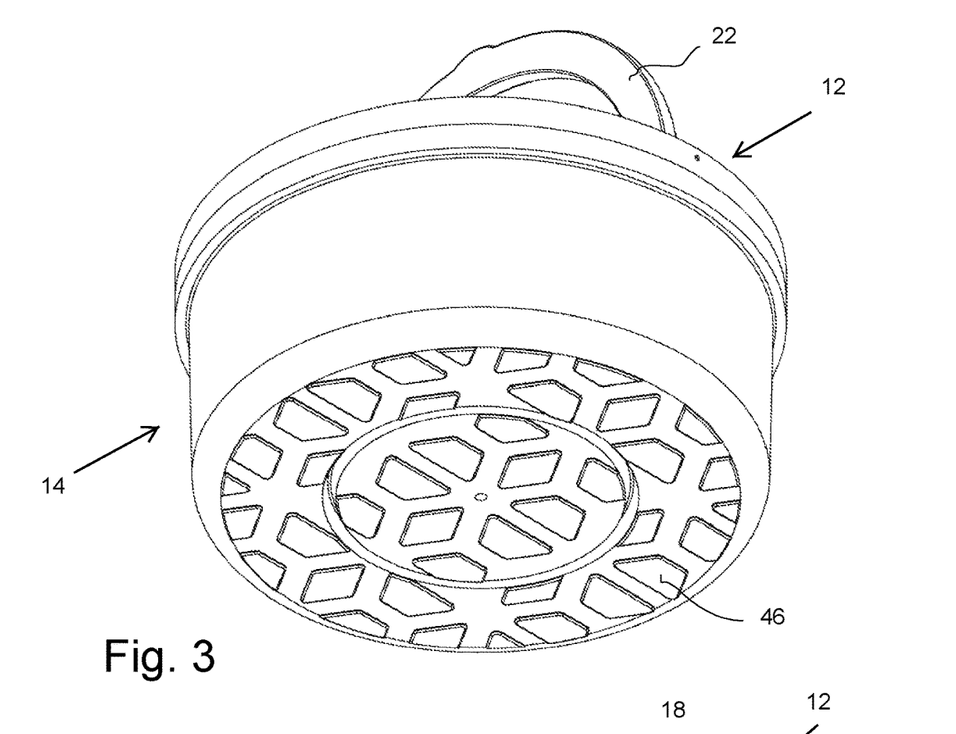
FIG. 3 shows an oblique view of the pet bowl assembly in the portable configuration illustrating the bottom of the first bowl.
Figure 4:
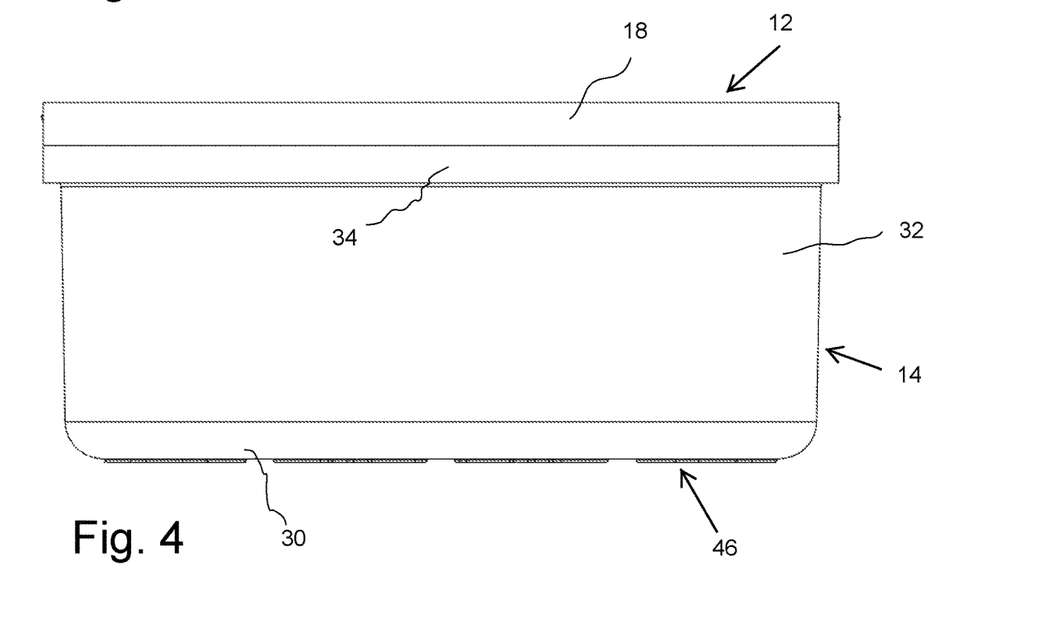
FIG. 4 shows an elevation view of the pet bowl assembly in the portable configuration.
Figure 5:
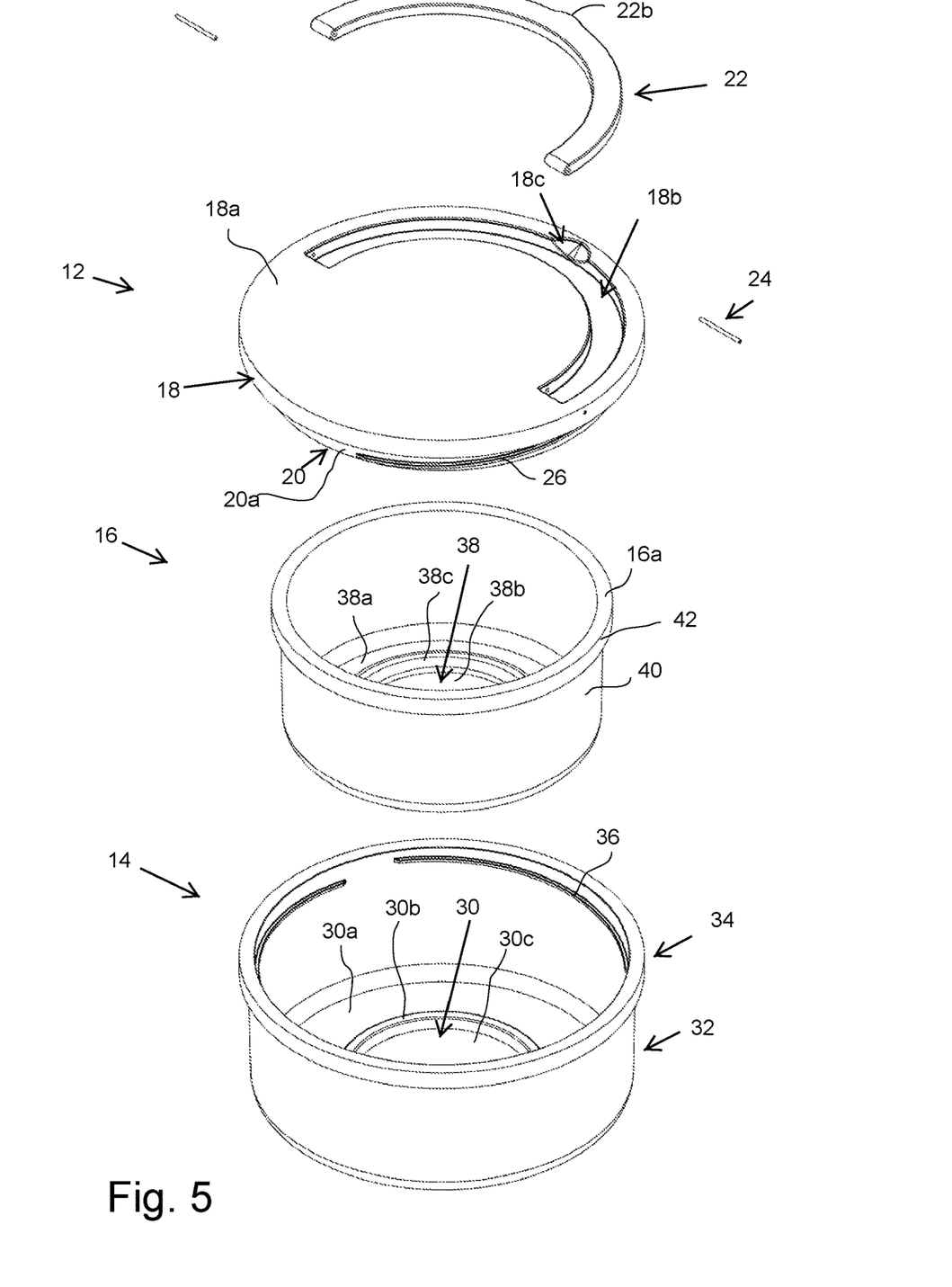
FIG. 5 shows an exploded view of the pet bowl assembly.

Lid 12 is formed by a base 18 the shape of a disc and an annular lip 20 extending axially downward from base 18. An upper surface 18a of base 18 includes an arc shaped recess 18b formed therein that receives an articulable handle 22. Handle 22 is rotatably fixed to lid 12 by pins 24 (FIG. 5). When handle 22 is received inside recess 18b, an upper surface 22a of handle 22 is positioned in plane that is coincident with a plane of upper surface 18a or offset from the plane of upper surface 18a in the direction of recess 18b such that handle 22 does not protrude out of recess 18b past upper surface 18a adjacent to recess 18b. A slot 18c formed in upper surface 18a of base 18 protrudes radially away from a midsection of recess 18b to allow for a user to grip a radial extension 22b of handle 22 and pull handle 22 out of recess 18b for rotation about pins 24.

As shown in FIGS. 5 to 10, an outer circumferential surface 20a of annular lip 20 is provided with at least one protrusion 26 extending radially outward from an outer circumferential surface 20a of lip 20. In the illustrated embodiment, lip 20 includes three semi-helically shaped protrusions 26 that are spaced circumferentially from each other, with each protrusion 26 extending circumferentially along surface 20a while extending axially away from a lower edge 20b of annular lip 20.

Figure 8:
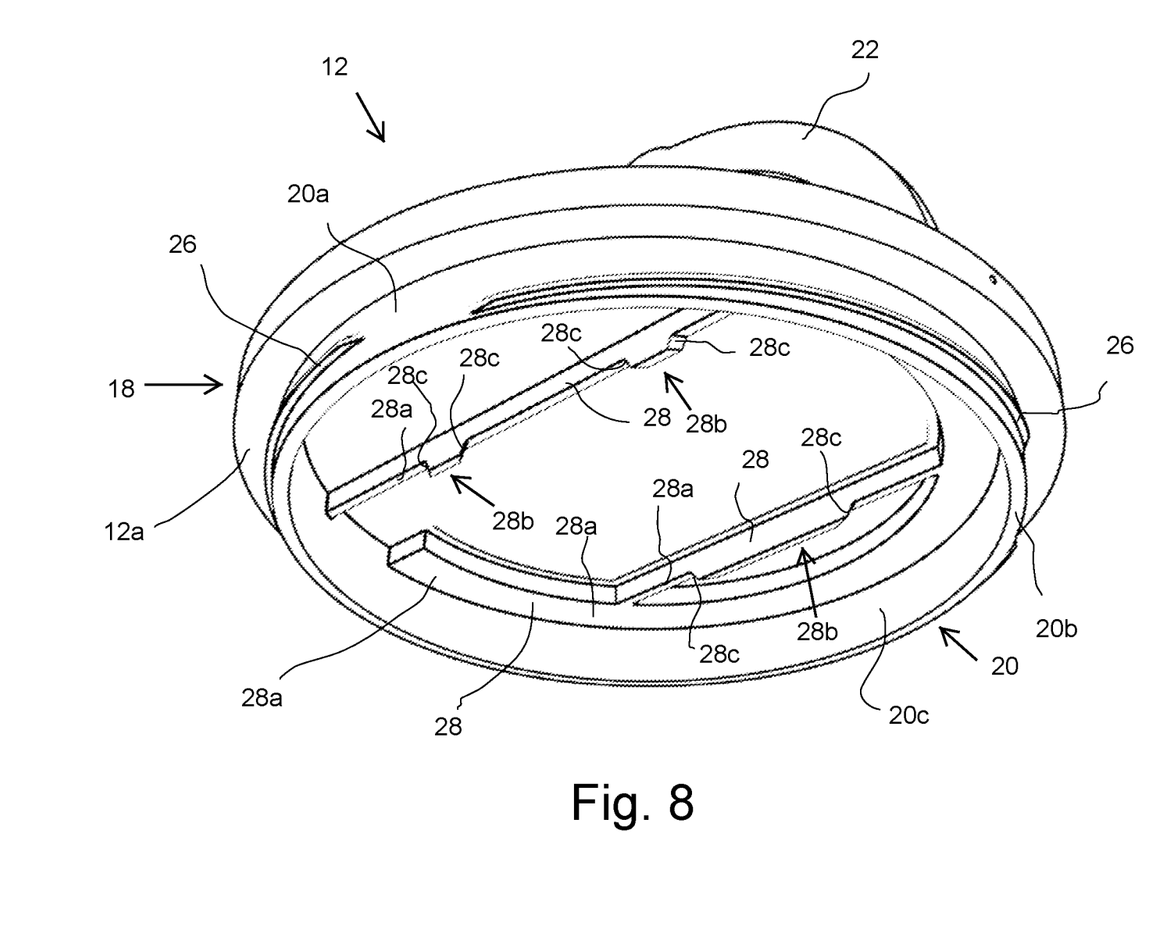
FIG. 8 shows an oblique view illustrating an underside of the lid.
Figure 9:
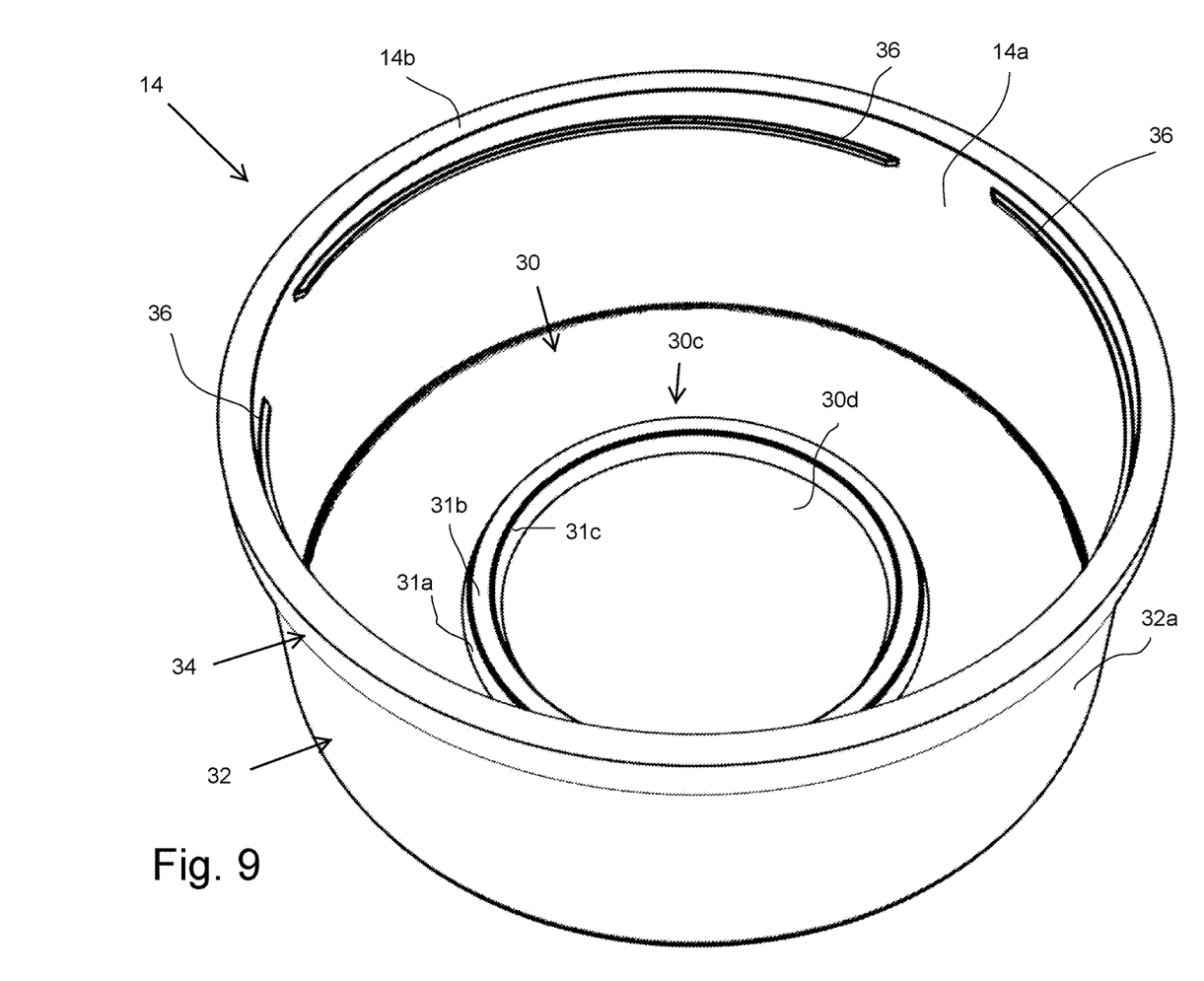
FIG. 9 shows an oblique view illustrating an interior of the first bowl.
Figure 10:
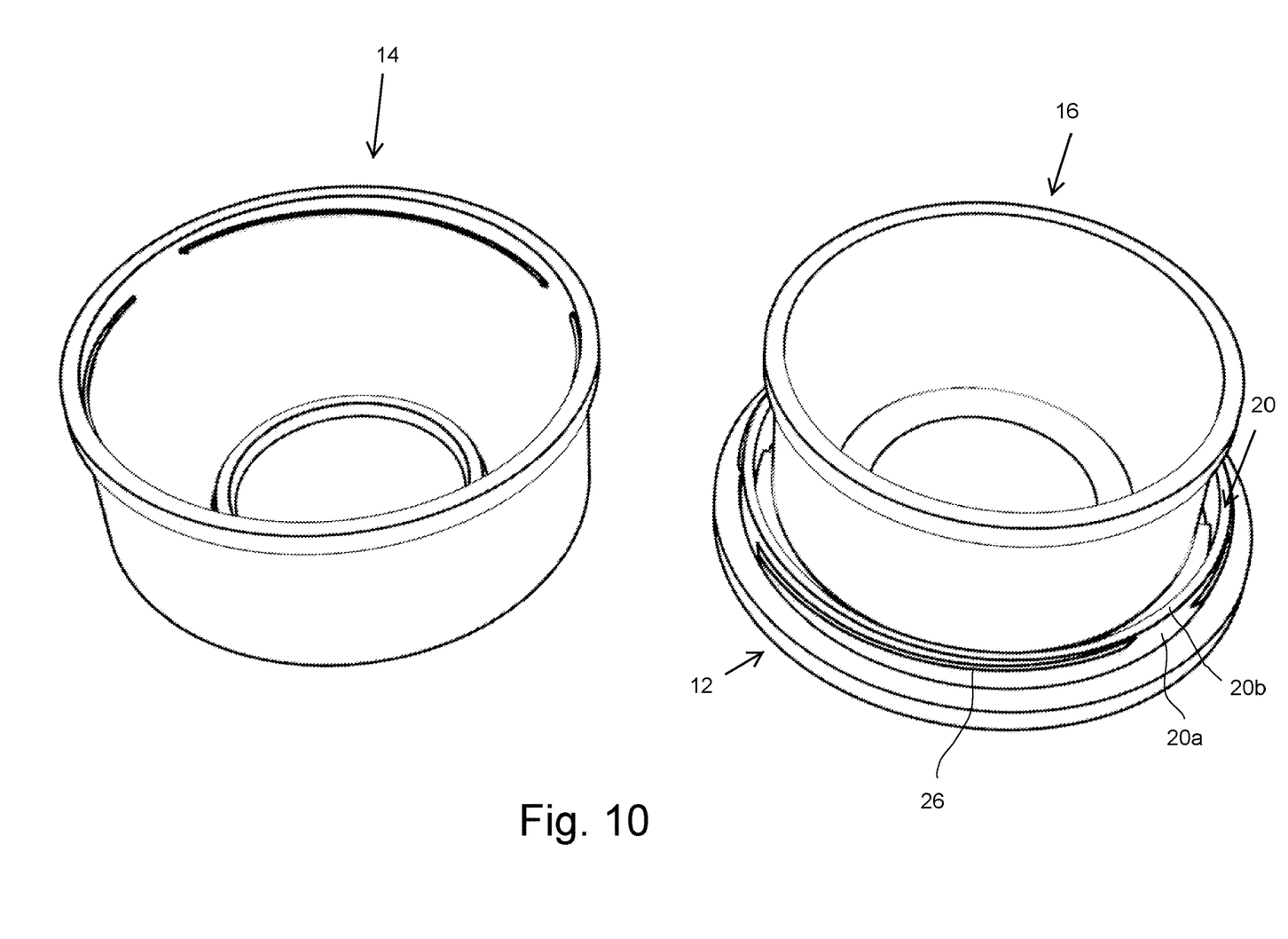
FIG. 10 shows an oblique view illustrating the pet bowl assembly in a feeding configuration, with the lid overturned on the ground, the second bowl resting on the lid and the first bowl resting on the ground.

As shown in FIG. 8, radially inside of lip 20, lid 12 includes support sections 28 that are configured to form support surfaces 28a, which are lower surfaces of lid 12, for contacting upper surface 16a of second bowl 16 when second bowl 16 is inside of first bowl 14. Surfaces 28a are also for contacting lower surface 38f of base 38 of second bowl 16 for supporting second bowl 16 when upper surface 18a of lid 12 is resting on the ground or a support surface and second bowl 16 is placed on top of lid 12 inside of lip 20. Support sections 28 are also provided with axial protrusions 28b protruding axially from support surfaces 28a configured for insertion into recess 38e of second bowl 16 when lid 12 is lying top down on the ground. Edges 28c of axial protrusions 28b contact and center second bowl 16 when second bowl 16 rests on lid 12, as discussed further below.

Figure 6:
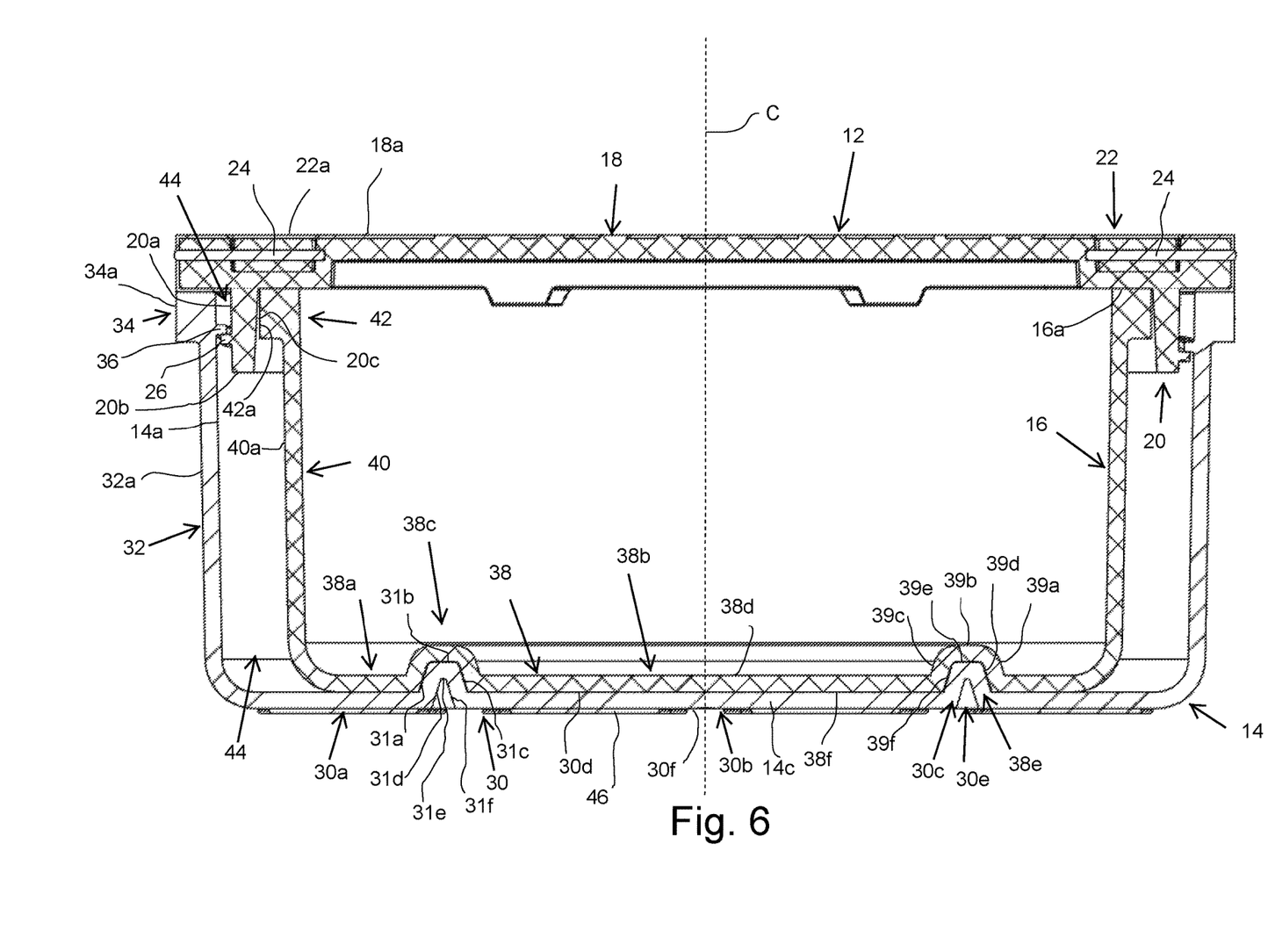
FIG. 6 shows a cross-sectional view of the pet bowl assembly in the portable configuration.

As shown in FIG. 6, first bowl 14 includes a base 30 shaped as a disc and a cylindrical wall formed by a first radially thinner wall section 32 extending axially upward from base 30 and a second ring wall section 34 on top of wall section 32. Ring section 34 is radially thicker than wall section 32 and extends radially outward further than wall section 32 such than an outer circumferential surface 32a of wall section 32 is a greater distance from center axis C than an outer circumferential surface 34a of ring section 34. Base 30 includes a radially outer flat annular section 30a, a central disc section 30*b* intersecting center axis C and a first bowl engagement section formed by an axially protruding section 30*c*, in the shape of a ring, provided radially between section 30*a* and section 30*b*. Sections 30*a*, 30*b* are provided in the same plane as each other and section 30*c* protrudes axially above sections 30*a*, 30*b*.

More specifically, axially protruding section 30*c* extends axially from an upper surface 30*d* defined by sections 30*a*, 30*b* of base 30. Section 30*c* is hollow to define an annular recess 30*e* in a bottom surface 30*f* of base 30 radially between sections 30*a*, 30*b*. Section 30*c* includes an upper radially outer axially extending surface 31*a*, an upper radially extending surface 31*b* and an upper radially inner axially extending surface 31*c*, and a lower radially outer axially extending surface 31*d*, a lower radially extending surface 31*e* and a lower radially inner axially extending surface 31*f* defining recess 30*e*. Upper radially outer axially extending surface 31*a* extends axially from upper surface 30*d* of section 30*a* to join upper radially extending surface 31*b*, which extends radially inward from surface 31*a* to upper radially inner axially extending surface 31*c*, which extends axially away from surface 31*b* to upper surface 30*d* of section 30*b*. Lower radially outer axially extending surface 31*d* extends axially from lower surface 30*f* of section 30*a* to join lower radially extending surface 31*e*, which extends radially inward from surface 31*d* to lower radially inner axially extending surface 31*f*, which extends axially away from surface 31*e* to lower surface 30*f* of section 30*b*.

Cylindrical wall section 32 and ring section 34 together define an inner circumferential surface 14*a* of first bowl 14. Inner circumferential surface 14*a* is provided with at least one protrusion 36 extending radially inward from surface 14*a*. In the illustrated embodiment, first bowl 14 includes a plurality of arcuate protrusions 36, more specifically three semi-helically shaped protrusions 36 that are spaced circumferentially from each other, with each protrusion 36 extending circumferentially along surface 14*a* while extending axially away from base 30. In other embodiments, bowl 14 may include more or less than three protrusions 36.

Second bowl 16 includes a base 38 shaped as a disc, a cylindrical wall formed by a first radially thinner wall section 40 extending axially upward from base 38 and ring wall section 42 on top of wall section 40. Ring section 42 is radially thicker than wall section 40 and extends radially outward further than wall section 40 such than an outer circumferential surface 40*a* of wall section 40 is a greater distance from center axis C than an outer circumferential surface 42*a* of ring section 42. Base 38 includes a radially outer flat annular section 38*a*, a central disc section 38*b* intersecting center axis C and a second bowl engagement section formed by an axially protruding section 38*c*, in the shape of a ring, provided radially between section 38*a* and section 38*b*. Sections 38*a*, 38*b* are provided in the same plane as each other and section 38*c* protrudes axially above sections 38*a*, 38*b*.

More specifically, axially protruding section 38*c* extends axially from an upper surface 38*d* defined by sections 38*a*, 38*b* of base 38. Section 38*c* is hollow to define an annular recess 38*e* in a lower surface 38*f* of base 38 radially between sections 38*a*, 38*b*. Section 38*c* includes an upper radially outer axially extending surface 39*a*, an upper radially extending surface 39*b* and an upper radially inner axially extending surface 39*c*, and a lower upper radially outer axially extending surface 39*d*, a lower radially extending surface 39*e* and a lower radially inner axially extending surface 39*f* defining recess 38*d*. Upper radially outer axially extending surface 39*a* extends axially from upper surface 38*d* of section 38*a* to join upper radially extending surface 39*b*, which extends radially inward from surface 39*a* to upper radially inner axially extending surface 39*c*, which extends axially away from surface 39*b* to upper surface 38*d* of section 38*b*. Lower radially outer axially extending surface 39*d* extends axially from lower surface 38*f* of section 38*a* to join lower radially extending surface 39*e*, which extends radially inward from surface 39*d* to lower radially inner axially extending surface 39*f*, which extends axially away from surface 39*e* to lower surface 38*f* of section 38*b*.

For storage and transportation, second bowl 16 is insertable inside of first bowl 14 and lid 12 is connectable to first bowl 14 with second bowl 16 inside of first bowl 14. Axially protruding section 30*c* is sized and shaped for insertion into recess 38*e* of second bowl 16. More specifically, second bowl 16 is placed inside of first bowl 14 such that recess 38*e* of second bowl 16 is placed onto axially protruding section 30*c* of first bowl 14 such that second bowl 16 is radially fixed in place inside of first bowl 14. In other words, section 38*c* of second bowl 16 is engaged with section 30*c* of first bowl 14 to center second bowl 16 within first bowl 14. Upper surfaces 31*a*, 31*b*, 31*c* of section 30*c* of base 30 of first bowl 14 contact lower surfaces 39*d*, 39*e*, 39*f* of section 38*c* of base 38 of second bowl 16, while upper surfaces 30*d* of sections 30*a*, 30*b* of base 30 of first bowl 14 contact lower surfaces 38*f* of sections 38*a*, 38*b* of base 38 of second bowl 16.

Figure 7:
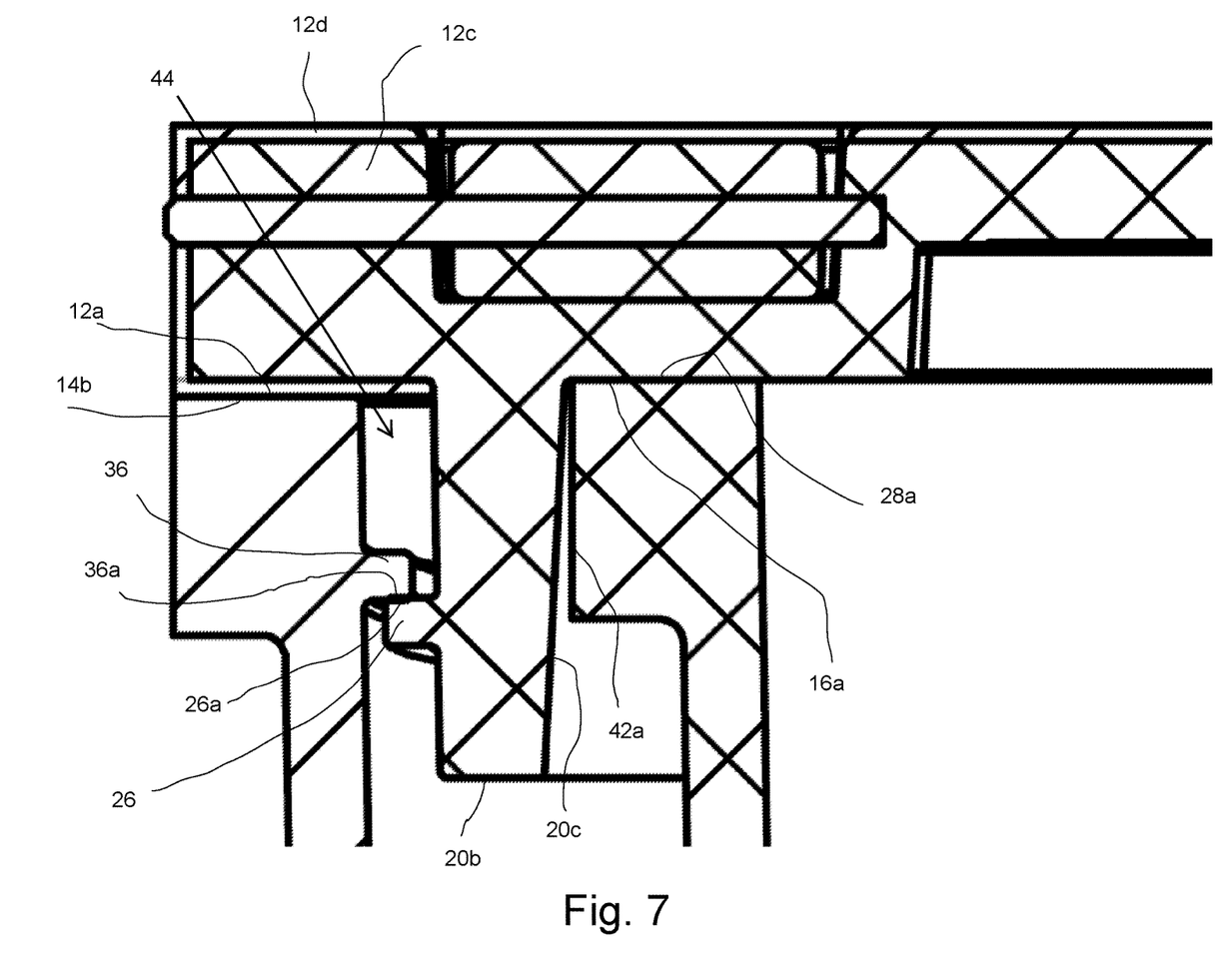
FIG. 7 shows an enlarged portion of the view shown in FIG. 7 illustrating the insertion of a lip of the lid between the first and second bowls.

As shown by FIG. 6 and the enlarged view shown in FIG. 7, after second bowl 16 is centered within first bowl 14 by the contact between engagement sections 30*c*, 38*c*, lid 12 is connected to first bowl 14 by inserting lip 20 radially between first bowl 14 and second bowl 16. Lip 20 is forced downward into an annular space 44 formed radially between the outer diameter of second bowl 16 and the inner diameter of first bowl 14 such that upper surfaces 26*a* of protrusions 26 axially contact lower surfaces 36*a* of protrusions 36 and an inner circumferential surface 20*c* of lip 20 radially contacts outer circumferential surface 42*a* of ring section 42. At the same time, an upper surface 14*b* of first bowl 14, which forms a rim of first bowl 14, contacts a lower surface 12*a* of lid 12 at an outer periphery of base 18 that is outside of lip 20 and an upper surface 16*a* of second bowl 16, which forms a rim of second bowl 16, contacts a lower surface 28*a* of lid 12 at a portion of base 18 that is directly radially adjacent to lip 20 radially inside of lip 20. Inner circumferential surface 20*c* of lip is tapered such that surface 20*c* extends radially outward while extending axially away from base 18 such that surface 20*c* is wedged onto ring section 42 with an upper end of outer circumferential surface 42*a* of ring section 42 contacting the upper end of inner circumferential surface 20*c*. The engagement of protrusions 26 of lid 12 with protrusions 36 of first bowl 14 connects lid 12 to first bowl 14 while the engagement of inner circumferential surface 20*c* of lip with outer circumferential surface 42*a* and the engagement of section 30*c* of first bowl 14 with section 38*c* of second bowl 16 hold second bowl 16 radially in place inside of the first bowl 14 and lip 20. In the illustrated embodiment, the upper surfaces 26*a* of protrusions 26 can be forced into the lower surfaces 36*a* of protrusions 36 by the rotation of lid 20 due to the semi-helical shapes of protrusions 26, 36.

The portable bowl assembly 10 can used to transport pet food inside of second bowl 16 when lid 12 is secured to first bowl 14 with second bowl 16 secured inside of first bowl 14 by first bowl 14 and lid 12. Second bowl 16 is held axially in place inside of first bowl 14 and lid 12 by being axially sandwiched between base 30 of bowl 14 and base 18 of lid 12. More specifically, second bowl 16 is held axially in place inside of first bowl 14 and lid 12 by lower surface 38f of bowl 16 contacting upper surface 30d of bowl 14 and by upper surface 16a of bowl 16 contacting lower surface 28a of lid 12. Second bowl 16 is held radially in place inside of first bowl 14 and lid 12 by being radially held in place by engagement section 30c of bowl 14 and lip 20 of lid 12. More specifically, second bowl 16 is held radially in place inside of first bowl 14 and lid 12 by engagement section 38c of bowl 16 radially contacting engagement section 30c of bowl 16 and by outer circumferential surface 42a of bowl 16 contacting inner circumferential surface 20c of lid 12.

In order to provide food and water to a pet, lid 12 can be removed by disconnecting lid 12 from first bowl 14. In the illustrated embodiment, the removal of lip 12 can be accomplished by disengaging protrusions 26a of lid 12 from protrusions 36 of bowl 14 by rotating lid 12 in the direction opposite of the direction lid 12 was rotated to secure lid 12 into place on first bowl 14. After lid 12 is removed, it is designed to be flipped over and laid on the ground with surface 18a of lid 12 on the ground with support sections 28 facing upward. Second bowl 16 can then be placed onto lid 12 with engagement section 38c positioned on top of axial protrusions 28b of support sections 28 such that axial protrusions 28b are received in recesses 38e and edges 28c contact surfaces 31a and/or surfaces 31c to center second bowl 16 on lid 12. As shown in FIG. 7, lid 12 is formed by a base material 12c that is cover with a layer 12d of a non-slip material having a greater coefficient of friction than base material 12c to generate friction with the ground that prevents lid 12 and bowl 16 from sliding while the pet is eating food out of second bowl 16. First bowl 14 can also be placed on the ground and filled with water. A layer of non-slip material is also provided on lower surface 30f of first bowl 14 in the form of segments 46 having a greater coefficient of friction than a base material 14c to generate friction with the ground that prevents bowl 14 from sliding while the pet is drinking water out of first bowl 14. The non-slip material may be made of silicon or plastic and the remainder of lid 12 and bowls 14, 16, including base materials 12c, 14c, may be made of biodegradable plastic.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A pet bowl assembly comprising:
a first bowl including a first base and a first wall extending axially upwardly from the first base;
a second bowl including a second base and a second wall extending axially upwardly from the second base, the second bowl configured for being received inside of the first bowl with the second base resting on the first base; and
a lid including a lid base and a lip protruding downwardly from the lid base, the lip being configured for insertion in contact with the second wall such that the lid is configured for holding the second bowl in place inside the first bowl while an engagement of a lid engagement section of the lid with a first bowl engagement section of the first bowl removably connects the lid to the first bowl, the lid engagement section being on an outermost circumferential surface of the lip and the first bowl engagement section being on an inner circumferential surface of the first wall, the lid engagement section protruding outwardly toward the first bowl and the first bowl engagement section protruding inwardly toward the lip.

2. The pet bowl assembly as recited in claim 1, wherein the lid is configured such that an inner circumferential surface of the lid radially contacts an outer circumferential surface of the second wall when the lid is connected to the first bowl.

3. The pet bowl assembly as recited in claim 2, wherein an upper surface of the second wall contacts a lower surface of the lid base when the lid is connected to the first bowl.

4. The pet bowl assembly as recited in claim 2, wherein the first base includes a first base engagement section and the second base include a second base engagement section, the first base engagement section configured for engaging with the second base engagement section to center the second bowl within the first bowl such that the second bowl is held radially in place in the first bowl by the engagement between the first and second engagement sections and by the lid radially contacting the outer circumferential surface of the second wall when the lid is connected to the first bowl.

5. The pet bowl assembly as recited in claim 4, wherein the first base engagement section includes a first axial protrusion extending above an upper surface of the first base and the second base engagement section includes a recess configured for receiving the first axial protrusion.

6. The pet bowl assembly as recited in claim 4, wherein a lower surface of the lid base includes a support section, the support section configured for engaging with the second base engagement section when an upper surface of the lid is placed on the ground on the second bowl is placed on top of the lid.

7. The pet bowl assembly as recited in claim 1, wherein at least one of the lid engagement section and the first bowl engagement section is helically shaped.

8. The pet bowl assembly as recited in claim 1, wherein the lid is configured to contact an upper surface of the first wall and an upper surface of the second wall when the second bowl is received inside of the first bowl and the lid is connected to the first bowl.

9. The pet bowl assembly as recited in claim 1, wherein the first bowl engagement section and the lid engagement section each includes a plurality of arcuate protrusions, an upper surface of each of the arcuate protrusions of the lid engagement section contacting a lower surface of a respective one of the arcuate protrusions of the first bowl engagement section.

10. The pet bowl assembly as recited in claim 1, wherein the first bowl, the second bowl and the lid are configured such that a rotation of the lid onto the first bowl causes the lid engagement section to engage the first bowl engagement section and causes an upper surface of the second wall to contact the lid.

11. The pet bowl assembly as recited in claim 1, wherein the lid is configured to contact an upper surface of the first wall and an upper surface of the second wall when the second bowl is received inside of the first bowl and the lid is connected to the first bowl,
wherein the first bowl engagement section and the lid engagement section each includes a plurality of arcuate protrusions, an upper surface of each of the arcuate protrusions of the lid engagement section contacting a lower surface of a respective one of the arcuate protrusions of the first bowl engagement section when the second bowl is received inside of the first bowl and the lid is connected to the first bowl, wherein the first bowl, the second bowl and the lid are configured such that a rotation of the lid onto the first bowl causes the arcuate protrusions of the lid engagement section to engage the arcuate protrusions of the first bowl engagement section and causes an upper surface of the second wall to contact the lid.

12. The pet bowl assembly as recited in claim 1, wherein a lower surface of the lid base that is radially outside of the lip contacts an upper surface of the first wall.

13. The pet bowl assembly as recited in claim 1, wherein the second bowl is held axially in place inside of the first bowl and the lid by a lower surface of the second base contacting an upper surface of the second base and by an upper surface of second contacting a lower surface of the lid.

14. A method of feeding a pet using a pet bowl assembly the pet bowl assembly comprising:
   a first bowl including a first base and a first wall extending axially upwardly from the first base;
   a second bowl including a second base and a second wall extending axially upwardly from the second base, the second bowl configured for being received inside of the first bowl with the second base resting on the first base; and
   a lid including a lid base and a lip protruding downwardly from the lid base, the lip being configured for insertion in contact with the second wall such that the lid is configured for holding the second bowl in place inside the first bowl while an engagement of a lid engagement section of the lid with a first bowl engagement section of the first bowl removably connects the lid to the first bowl, outermost circumferential surface of the lip and the first bowl engagement section being on an inner circumferential surface of the first wall, the lid engagement section protruding outwardly toward the first bowl and the first bowl engagement section protruding inwardly toward the lip, the method comprising:
   disconnecting the lid from the first bowl and removing the lid from the first and second bowls;
   placing the lid on a support surface;
   removing the second bowl from the first bowl and placing the second bowl on the lid; and
   providing one of food and water in the first bowl and providing the other of food and water in the second bowl.

15. The method as recited in claim 14, wherein the providing includes providing food in the second bowl prior to the lid being disconnected from the first bowl and providing water in the first bowl after the second bowl is removed from the first bowl.

* * * * *